United States Patent [19]

Bader et al.

[11] Patent Number: 4,838,908

[45] Date of Patent: Jun. 13, 1989

[54] ENGINE AIR INTAKE SCREEN ASSEMBLY

[75] Inventors: Mark S. Bader, Sheboygan Falls; Robert L. Miller, Sheboygan, both of Wis.

[73] Assignee: Kohler Co., Kohler, Wis.

[21] Appl. No.: 225,114

[22] Filed: Jul. 27, 1988

[51] Int. Cl.⁴ .................................... B01D 53/24

[52] U.S. Cl. .................................... 55/385.1; 55/407; 55/437; 123/41.66; 123/41.79

[58] Field of Search .................... 55/290, 385.1, 385.3, 55/400, 407, 434, 437–439; 123/41.65, 41.66, 41.7, 41.79, 41.8

[56] References Cited

U.S. PATENT DOCUMENTS

| | | | |
|---|---|---|---|
| Re. 23,146 | 9/1949 | Packwood . | |
| 1,649,220 | 11/1927 | Goodloe | 55/290 |
| 2,034,323 | 3/1936 | Bernard | 55/385.1 X |
| 2,601,907 | 7/1952 | Burrows et al. . | |
| 2,823,656 | 2/1958 | Dolza | 55/400 X |
| 2,834,419 | 5/1958 | Sebok | 55/434 X |
| 2,848,987 | 8/1958 | Morden | 123/179 |
| 3,183,899 | 5/1965 | Tuggle | 123/41.65 |
| 3,252,449 | 5/1966 | Couchman, Jr. et al. | 123/41.65 |
| 3,276,679 | 10/1966 | Booth | 55/407 X |
| 3,371,471 | 3/1968 | Connors | 55/434 X |
| 3,433,206 | 3/1969 | Pennington | 123/41.7 |
| 3,566,848 | 3/1971 | Dobbertin | 123/41.65 |
| 3,744,468 | 7/1973 | Braun | 123/41.7 X |
| 3,952,712 | 4/1976 | Hermanson | 123/41.65 |
| 3,994,067 | 11/1976 | Hazzard et al. | 55/385.1 X |
| 4,261,302 | 4/1981 | Sheldon | 123/41.65 X |
| 4,323,369 | 4/1982 | Monson et al. | 55/1 |
| 4,358,303 | 11/1982 | Rakow | 55/385.1 X |
| 4,589,379 | 5/1986 | Fujikawa et al. | 123/41.49 |

FOREIGN PATENT DOCUMENTS

| | | | |
|---|---|---|---|
| 3423047 | 1/1986 | Fed. Rep. of Germany | 55/439 |

OTHER PUBLICATIONS

Jul. 1988 Kawasaki ad entitled "Engines of the Future, Today" (admitted prior art).

*Primary Examiner*—Robert Spitzer

*Attorney, Agent, or Firm*—Quarles & Brady

[57] ABSTRACT

An engine intake screen assembly is provided. A rotatable screen has a continuous peripheral skirt which telescopes with an upstanding housing ring-like flange so as to create a serpentine entry path for grass and other foreign matter trying to enter at the seam between the screen and the inlet. Entry can be further restricted through the use of a radially outwardly directed ring extension on the screen and/or a guard ring member. These parts can combine to form a trap pocket and/or to increase the serpentine nature of the entry path. In one version, the grass will form its own seal in the trap.

5 Claims, 2 Drawing Sheets

FIG. 3
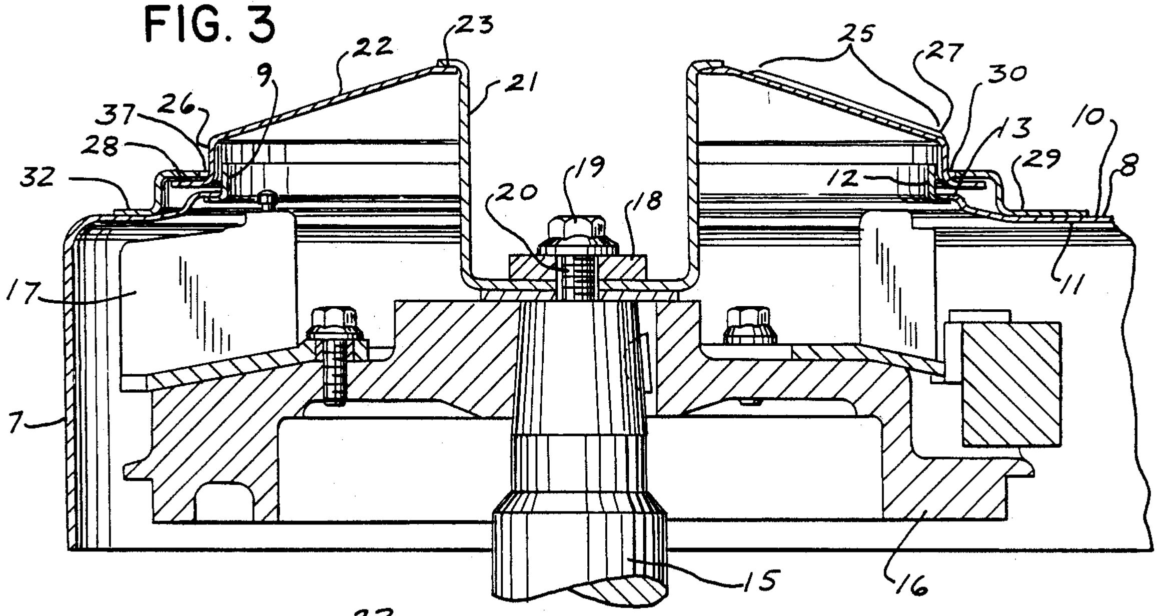
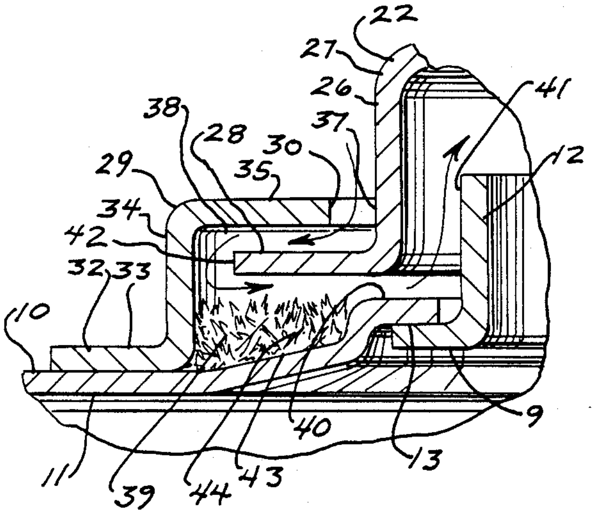
FIG. 4
FIG. 5
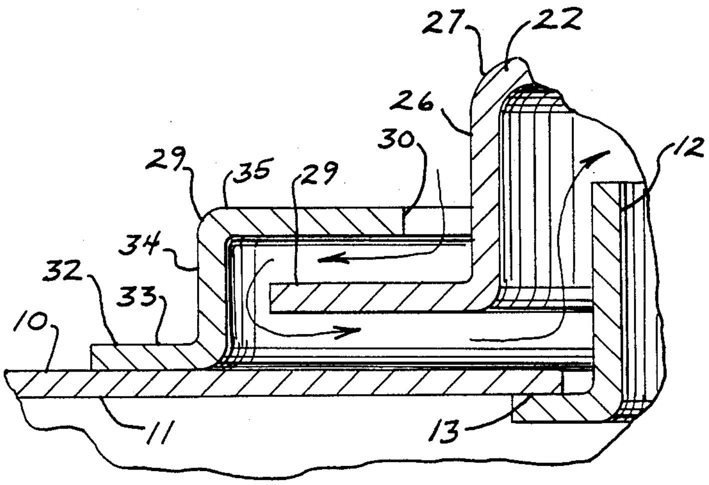

ENGINE AIR INTAKE SCREEN ASSEMBLY

FIELD OF THE INVENTION

The present invention relates to internal combustion engines. More particularly, it relates to engine air intake screen assemblies that permit such engines to be used in environments where grass, straw, seeds, and other debris are prevalent.

BACKGROUND OF THE INVENTION

Internal combustion engines that are used on agricultural equipment (e.g. mowers) are often exposed to air that contains a large quantity of foreign matter. During the normal operation of such engines, the engines draw in air for combustion and cooling purposes. Mesh screens are typically placed over the air intake port on such engines in order to try to reduce the amount of foreign matter which reaches the engine interior. The screens can be designed so as to rotate along with the engine cooling fan so as to fling foreign matter away from the screen as it nears the air intake.

Even when rotating screens are used, there can still be problems with respect to foreign matter entering the engine housing between the screen peripheral edge and the inlet edge. Clogging and premature engine wear can result. The art has tried to solve this problem by using fan housing pressure to create back pressure adjacent the seam (see e.g. U.S. Pat. No. 3,183,899). However, this approach wastes valuable engine cooling air (thus decreasing cooling efficiency).

Another attempt to solve this problem is described in U.S. Pat. No. 4,589,379. With this approach, an upstanding annular flange is provided on the top of the fan housing, and the screen periphery extends over the flange and has blade elements that are bent down outside of the flange. This assembly cuts up the grass as it enters. While this system reduces the problems involved in the entry of long grass, it still permits an undesirable amount of cut pieces to be drawn in by the engine fan.

It can therefore be seen that an improved engine intake screen assembly is desired.

SUMMARY OF THE INVENTION

The invention provides an engine air intake screen assembly that more effectively blocks the entry of debris. In the preferred embodiment, the assembly has a shaft that rotates when the engine is running, a screen and a fan. The screen and fan are adapted to be operatively connected to and rotated by the shaft.

A fan housing is positioned around the fan. The housing has a wall with an air intake port formed therein. The upstream side of that wall has an upstream directed substantially continuous annular flange that surrounds the intake port. The screen is positioned upstream of the intake port and rib. The screen has a downstream directed substantially continuous peripheral skirt that is positioned radially outward of the annular flange. As a result of this structure, foreign matter seeking to enter the air intake port by traveling outside of the screen peripheral edge must follow a serpentine entry path before it can reach the interior of the fan housing.

Preferably, a guard ring is attached to the housing wall around the inlet. In an especially preferred form, the screen skirt has a continuous radially outwardly extending horizontal lip and the guard ring has a substantially continuous inwardly extending portion that overhangs the lip to form an even more serpentine path.

This arrangement also defines a trap between the guard ring, the screen, and the upstream side of the wall, and the trap preferably widens in the radially outward direction.

It will be appreciated that the overlapping, telescoping annular flange and screen peripheral skirt create a serpentine path through which the foreign matter must traverse before it can be drawn into the air intake port. Also, because of the rotation of the screen, and preferably the slope of the screen top surface, only a very small amount of foreign matter will even make it to the entry point of this path during normal operation (as opposed to being flung away by the rotation of the screen). Moreover, in the preferred embodiment foreign matter that does make it into the path will likely be caught in the trap. As more and more material is trapped, the path acts as a better and better seal.

The objects of the invention include providing an engine air intake screen assembly of the above kind:

(a) which is well suited for use on mowers and other agricultural equipment;

(b) which is relatively inexpensive to produce and easy to assemble;

(c) in which a serpentine path is used to block debris and thus substantially lower the amount of foreign matter entering; and (d) in which the foreign matter that enters forms its own seal.

These and still other objects and advantages of the present invention will be apparent from the description which follows. These embodiments do not represent the full scope of the invention. Rather, the invention may be employed in other embodiments. Reference should therefore be made to the claims herein for interpreting the scope of the invention.

BRIEF DESCRIPTION OF THE DRAWINGS

FIG. 3 is a sectional view taken along line 3—3 of FIG. 1 in the direction of the arrows, but only of the upper portion of the engine;

FIG. 4 is an enlarged sectional view of the trap portion of the invention; and FIG. 5 is a view similar to FIG. 4 of a second embodiment of the invention.

DESCRIPTION OF THE PREFERRED EMBODIMENTS

Figure 1:
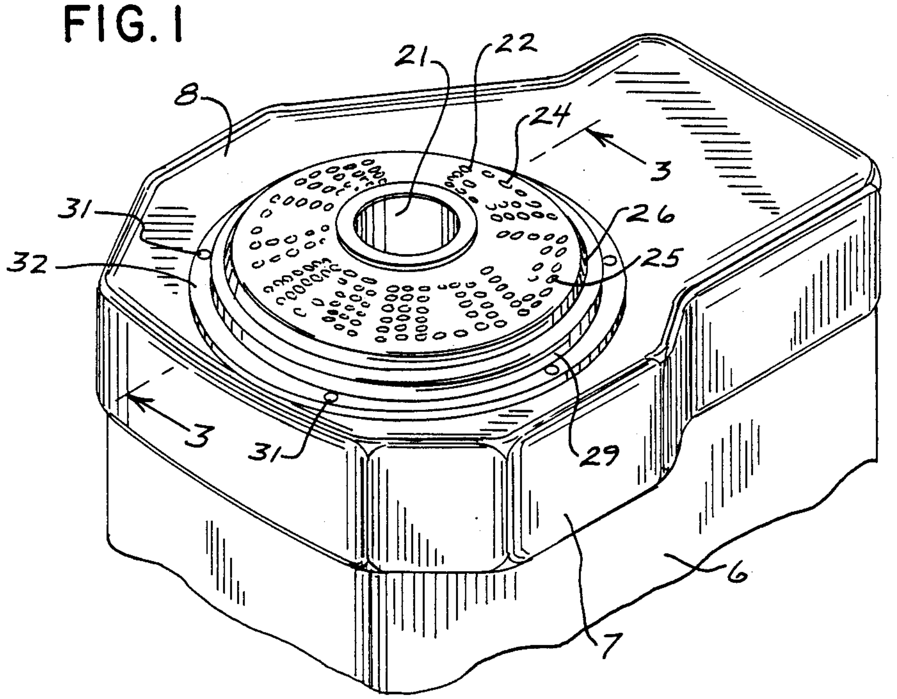
FIG. 1 is a perspective view showing an engine embodying the present invention.
Figure 2:
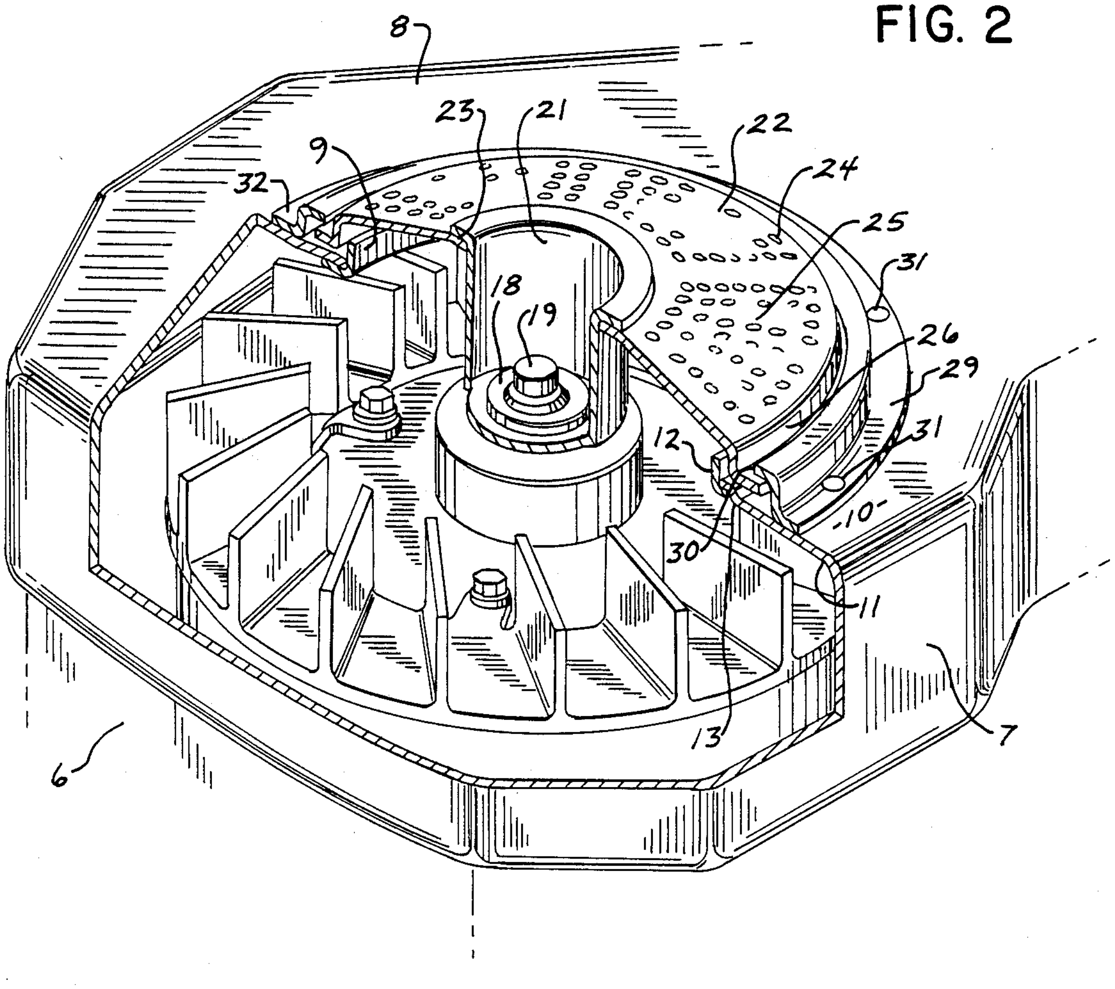
FIG. 2 is a view similar to that of FIG. 1, albeit enlarged and partially fragmented.

Referring to the drawings, the preferred engine is a vertical shaft engine 6. It has a fan housing 7 with upper housing wall 8. As shown in FIG. 2, the wall 8 has an inlet 9 extending from a wall upstream side 10 to wall downstream side 11. A continuous annular flange 12 surrounds the inlet 9. The flange 12 can be integral with the housing 7, or it can be separately formed and welded to wall 8 as shown at 13.

As shown in FIG. 3, the engine 6 has the usual motor shaft 15 connected to flywheel 16, which in turn is connected to a fan 17. Washer 18, nut 19, and bolt 20 connect a screen cup 21 to the shaft 15 to rotate therewith.

Screen 22 is either integrally formed with the cup 21, or welded or riveted to it at edge 23. The screen has an array of holes 24 (see FIG. 2) formed on upper portion 25 and the upper portion 25 is preferrably downwardly inclined from center to periphery. The edges of the screen holes are preferrably canted relative to the plane of the screen so as to impart greater motion to grass falling thereon.

Turning now to FIG. 4, continuous peripheral screen skirt 26 extends down from screen edge 27, and skirt 26 in turn has a radially outwardly projecting horizontal lip extension 28. Screen portions 26 and 28 are both continuous, with no screen holes.

Guard ring 29 has a central opening 30 aligned with inlet 9. The guard ring also has a series of circumferentially disposed through holes 31 on ring flange 32 (see FIG. 2). Guard ring portions 33–35 provide an "S" shaped cross section. Bolts (not shown) connect the guard ring 29 to wall 8 through corresponding aligned holes.

The several elements are relatively closely spaced and define a tortuous, serpentine path that must be followed by any debris before it can reach the interior of the engine. Referring to FIGS. 4 and 5, such debris must first move downwardly through a path entry 37 formed by the space between the guard portion 35 and skirt 26, turn left through the space 38 between guard portion 35 and lip 28, make a u-turn between the outer edge 42 of lip 28 and guard portion 34, and then move to the right and upwardly through the spaces 40, 41 between the skirt/lip and the inlet flange.

In the particularly preferred embodiment (see FIG. 4), the housing 7 is sloped downwardly to form an enlarged area 39 that serves as a trap as will be described below.

In operation, motor shaft 15 rotates on its own axis, carrying with it flywheel 16 and fan 17. Because of the angle of the fan blades, air is drawn in through inlet 9. Most of the air will enter through screen holes 24. However, some air will be drawn in via the guard/skirt/lip path. When grass (or other foreign matter) falls onto the screen, rotation of the screen will cause most of it to be flung away. As best understood from FIG. 3, the slope of the screen above entry 37 is such that as grass is being flung off the screen the guard ring prevents most grass from reaching the entry 37.

As an occasional blade of grass or the like reaches entry 37, the continued rotational force placed on the grass by screen skirt and the narrowness of opening 37 tend to cause the grass to be flung away even as it begins to enter pathway 37–41. Because all the path elements are substantially continuous, the foreign matter must travel along the full serpentine path in order to reach the engine interior.

In the preferred embodiment, the grass must also pass trap 39. Some of the first grass to reach that point will (due to gravity and the effect of edge 42) drop into trap 39. As grass builds up in the trap, the grass forms its own seal 44, and this further reduces the amount of grass that can make its way through.

This self-sealing effect also takes place in the FIG. 5 embodiment, but the seal appears to form more quickly in the FIG. 4 version because the trap widens in a radially outward direction.

It will therefore be appreciated that the preferred embodiment reduces grass entry by using a serpentine path, a self-sealing trap, and a screen designed to cause grass to be flung away from the serpentine path entry. These factors combine to reduce clogging and overheating problems. In fact, in one test an engine was able to resist clogging even when bushel after bushel of cut grass was deliberately dumped directly on the rotating screen.

While two embodiments have been depicted in the drawings, it will be appreciated that other embodiments may also be within the scope of the invention. For example, the use of the horizontal lip 28 is not always required, albeit its use is highly preferred. Also, the structure of the cup portion and the exact way that the cup/screen connect to the shaft is not critical. Moreover, horizontal shaft engines could be adapted to use this invention.

We claim:

1. In an engine intake screen assembly of the type having:
 (a) a shaft that rotates when the engine is running;
 (b) a screen and a fan, both adapted to be operatively connected to and rotated by the shaft;
 (c) a fan housing around the fan having a housing wall with an air intake port formed therein, the upstream side of said wall being formed with an upstream directed substantially continuous annular flange that surrounds the intake port; and
 (d) the screen being positioned upstream of the intake port and flange; the improvement comprising:
 the screen having a downstream directed substantially continuous peripheral skirt positioned radially outward of said annular flange so as to require foreign matter seeking to enter the air intake port by traveling outside the screen peripheral edge to follow a serpentine entry path in order to do so; and
 the screen has a radially outwardly directed substantially continuous lip extension extending from the screen peripheral edge which forms part of the serpentine entry path.

2. In an engine intake screen assembly of the type having:
 (a) a shaft that rotates when the engine is running;
 (b) a screen and a fan, both adapted to be operatively connected to and rotated by the shaft;
 (c) a fan housing around the fan having a housing wall with an air intake port formed therein, the upstream side of said wall being formed with an upstream directed substantially continuous annular flange that surrounds the intake port; and
 (d) the screen being positioned upstream of the intake port and flange; the improvement comprising:
 the screen having a downstream directed substantially continuous peripheral skirt positioned radially outward of said annular flange so as to require foreign matter seeking to enter the air intake port by traveling outside the screen peripheral edge to follow a serpentine entry path in order to do so; and
 a guard ring attached to said wall with a portion positioned upstream of the screen periphery and a portion positioned radially outward of the screen periphery.

3. The assembly of claim 2, wherein the guard ring has a substantially continuous annular portion extending upstream of said fan housing wall which is positioned radially outward of the screen peripheral edge so as to define a trap between the guard, the screen and the upstream side of said wall.

4. The assembly of claim 3, wherein the screen has a radially outwardly directed lip extension extending from the screen peripheral edge between the guard ring and fan housing wall.

5. The assembly of claim 3, wherein the trap widens in the radially outward direction.

* * * * *